3 Sheets—Sheet 1.

E. H. STEARNS.

Assignor to the STEARNS MANUFACTURING CO.

Head-Block for Saw-Mills.

No. 8,289. Reissued June 18, 1878.

Witnesses,

Jas. T. Miller

D. H. Dean

Inventor,

Edward H. Stearns

Per Jno. K. Wallock

Atty.

N. PETERS, PHOTO-LITHOGRAPHER, WASHINGTON, D. C.

E. H. STEARNS.
Assignor to the STEARNS MANUFACTURING CO.

Head-Block for Saw-Mills.

No. 8,289. Reissued June 18, 1878.

Witnesses,
Jas. F. Miller.
D. K. Dean

Inventor.
Edward H. Stearns
Per Jno K. Wallock
Atty.

N. PETERS, PHOTO-LITHOGRAPHER, WASHINGTON, D. C.

E. H. STEARNS.

Assignor to the STEARNS MANUFACTURING CO.

Head-Block for Saw-Mills.

No. 8,289. Reissued June 18, 1878.

Witnesses,

Jas. D. Miller

D. W. Dean

Inventor,

Edward H. Stearns

Per Chas. A. Wallock

Atty.

N. PETERS, PHOTO-LITHOGRAPHER, WASHINGTON, D. C.

UNITED STATES PATENT OFFICE.

EDWARD H. STEARNS, OF ERIE, PENNSYLVANIA, ASSIGNOR TO THE STEARNS MANUFACTURING COMPANY, OF SAME PLACE.

IMPROVEMENT IN HEAD-BLOCKS FOR SAW-MILLS.

Specification forming part of Letters Patent No. 199,667, dated January 29, 1878; Reissue No. 8,289, dated June 18, 1878; application filed May 18, 1878.

*To all whom it may concern:*

Be it known that I, EDWARD H. STEARNS, of Erie, in the county of Erie and State of Pennsylvania, have invented new and useful Improvements in Saw-Mill Head-Blocks; and I do hereby declare the following to be a full, clear, and exact description thereof.

The object of this invention is to improve the head-blocks of saw-mills; and consists, first, in an improvement in the setting mechanism; second, in an improvement in the knees; third, in the arrangement of these devices in conjunction with devices for making the knees self-receding.

Figure 1:
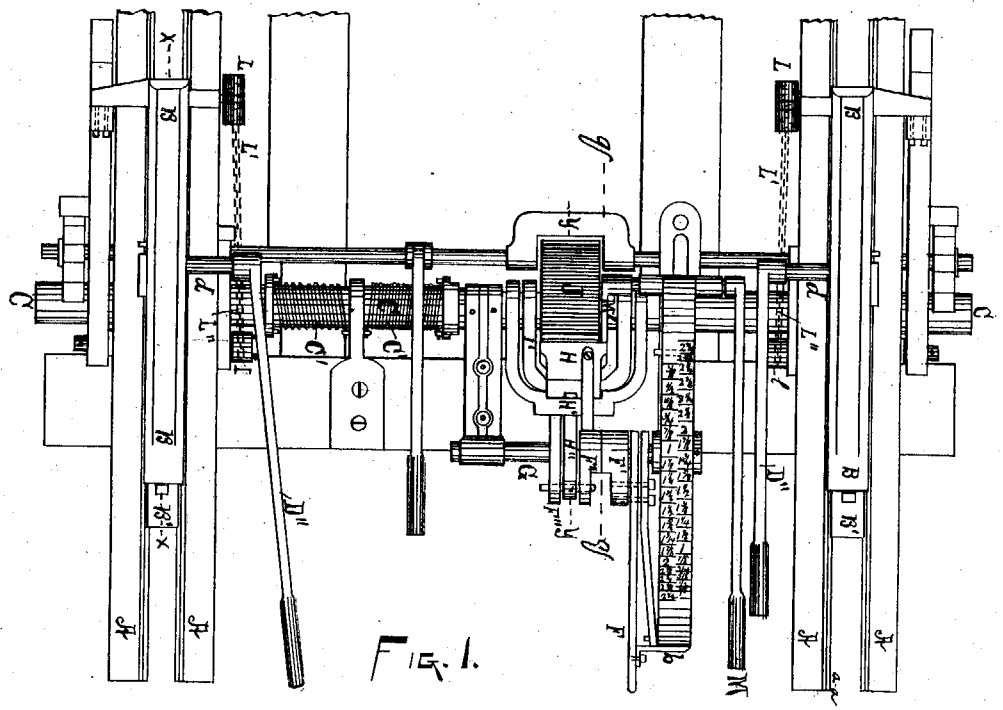
Figure 3:
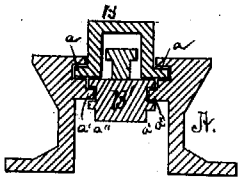
Figure 2:
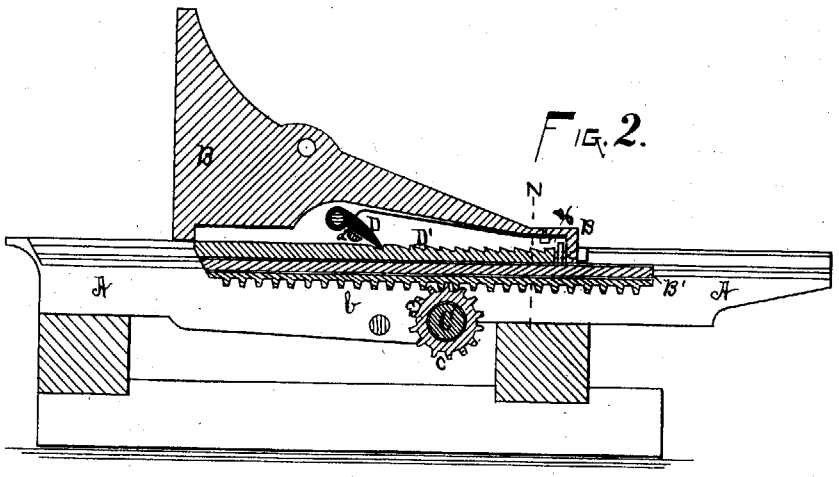
Figure 4:
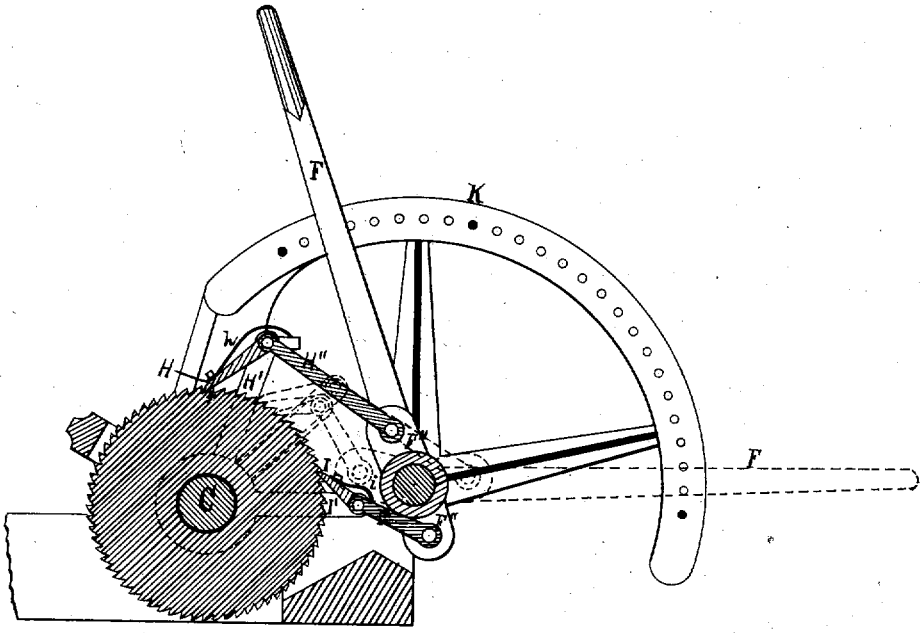
Figure 5:
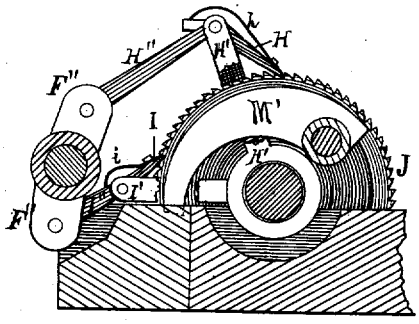

My device is shown in the accompanying drawings, of which there are three sheets, as follows: Figure 1 is a plan view of a set of head-blocks which contains my improvements. Fig. 2 is a longitudinal section of one of the knees and surrounding parts, taken on the line *x x*, Fig. 1. Fig. 3 is a transverse section of the same, taken on the line *z z*, Fig. 2. Fig. 4 is a transverse section of the setting mechanism, taken on the line *y y*, Fig. 1. Fig. 5 is a transverse section on the line *q q*, Fig. 1, with the setting device in elevation.

The letters of reference indicate parts as follows: A A are the bed-plates or beams, on which the log rests as it is fed to the saw. B B are the knees. B′ B′ are slides, which operate within the bed-plates, and to which the knees are detachably connected, and by which they are moved when connected thereto. C C is the actuating-shaft. C′ is a coil-spring for automatically reacting the shaft C. J is the ratchet-wheel by which the shaft C is actuated. F is the setting-lever. G is a counter-shaft, and serves as the fulcrum of the setting-lever. F″ is a crank, or rather a double crank, on the shaft G, and gives motion to the setting-pawls H and I. H′ and I′ are carriers for the pawls. H″ and I″ are connecting-rods, joining the crank F″ and the carriers H′ and I′.

Other letters used to indicate other parts will fully appear in the following general description.

First, of the setting mechanism: J is the ratchet-wheel, by which the actuating-shaft is propelled. This wheel is actuated by the action upon its surface of two pawls, H and I. These pawls are pivoted to carriers, which are so connected with the counter-shaft or the actuating-lever that the action of the pawls upon the ratchet are alternate, so that each swing or movement of the actuating-lever causes a movement of the ratchet and shaft. Broadly this is old. (See patent to John Cain, September, 1872, reissued April 9, 1878.) So far as the ratchet mechanism is concerned, my invention consists in the construction of the carriers which carry the pawls, and in the construction of the pawls themselves, and also in the manner of releasing said pawls from the ratchet.

The pawl-carriers are two yokes, pivoted onto the shaft bearing the ratchet, and hence concentric therewith. These yokes span the ratchet-wheel J. One is larger than the other—that is, it spans the other. By this arrangement the pawls work in the same plane, and do not pass each other on the ratchet. By this means I get a wide-bitted pawl without enlarging the ratchet-wheel laterally. This insures a firm gripe and avoids wear of the teeth of the ratchet. The pawls are pivoted to the bow or arch of their respective carriers, and each pawl has a spring, *h* and *i*, to keep it seated on the ratchet. The pawls project over the side of the ratchet, and below them is placed a trip, M′, which is operated by a lever, M. When this trip is raised the pawls are lifted from the ratchet, and the shaft C may revolve in the opposite direction. The object of this will appear hereinafter. The crank F″, with which the connecting-rods H″ and I″ connect, is, in fact, two cranks. The pins to which the rods are pivoted are not in line with the shaft G. This allows the rods and yoke to come into nearly a straight line without moving the lever F through too wide an arc, for convenience in operation, and still secure a sufficiently long traverse of the pawl on the ratchet.

The actuating-shaft C—that is, the shaft from which the knees are actuated—besides being provided with a ratchet by which it is moved, and pinions *c c*, by which it moves, is also provided with a spring, C′, coiled about it, and so adjusted that when the pawls are released by the trip from the ratchet the spring will recoil and revolve the shaft in an opposite direction from what the ratchet and pawls move it.

Reacting-springs have heretofore been used by me to recede the knees; but they were placed on a different shaft from the setting-shaft. (See patent to myself September 1, 1868, reissued November 7, 1871.) My present invention, in this respect, consists in combining upon one and the same shaft the springs, ratchet, and pinions, and providing releasing mechanism to operate in conjunction therewith, whereby the said shaft moves the knees forward or back as the ratchet device or springs are in operation.

The construction and operation of the knees are as follows:

This part of my invention relates to the construction and operation of that class of head-blocks in which the knees may be thrown out of gear with the mechanism by which they are propelled; and it consists in the means I have provided for thus throwing the knees out of gear, and also in the construction and operation of the various parts.

This part of my invention is shown best in Figs. 2 and 3, of which Fig. 2 is a longitudinal section of the knee and the bed-piece on which the knee operates and rests.

The bed-piece A is made of two walls, on the inner sides of which are the grooves *a* and *a* and the tongues *a′ a′* and *a″ a″*. The knee is provided with lateral projecting tongues, which fit into the grooves *a a*, and there the said knee has its bearing, on which it slides back and forth. The knee is also provided with a cavity on its lower side between the lateral projecting tongues. Between the walls of the bed-piece, and upon the tongues *a′ a′* and *a″ a″*, slides or operates a slide-block, B′. On the opposite side of this slide-block is attached a ratchet-bar, D′, and on the lower side is a rack-bar, *b*, which gears in the pinion *c* on the actuating-shaft C. By this rack-and-pinion arrangement the slide-block is moved at pleasure on the tongues *a′ a′* and *a″ a″*. The slide-block does not come in contact with the knee; but the ratchet-bar, which is attached to it, lies within the cavity of the knee. Within this cavity, and above the ratchet-bar, and attached to the knee, is a pawl, D, which can be raised or lowered at pleasure by moving the lever D″, which operates a cam, *d*, which operates upon a pawl. This pawl, when down, engages the teeth of the ratchet-bar D′, and when thus engaged the knee is made to move with the slide-block B′.

The position of the pawl, as shown in Fig. 2, is at what I call the "initial point," for it is there that it rests when all the knees are pulled back to receive a new log, and it remains at that point unless it is found necessary to put the knees out of line, as in sawing taper stuff or tapering logs. When such a change is desired, the pawl D of the knee which is to be left behind is raised, and the knee is detached from the slide-bar, and hence will not advance with the bar B′ when it advances; and when the pawl D is subsequently brought into engagement with the bar, it will fall into a notch back of the initial notch.

By this arrangement I avoid the use of independent knees, or knees provided with mechanism for operating them independently.

In place of the pawl D, any suitable clutching device may be used for establishing or cutting off connection between the knee and the slide.

In Fig. 2 it will be observed that when the slide B′ moves back the end of the ratchet-bar D′ will come in contact with the end of the cavity in the knee, and, no matter what notch the pawl may be in, it will traverse to the position shown—the initial position—and the knee will be carried back. At the point where the end of the ratchet-bar D′ comes in contact with the end of the cavity marked *z*, I place a buffer of some kind to receive and take up the shock.

On one side of the knee, near its standard, is a socket, L, in which is attached a chain, L′, which passes over a pulley or roller, *l*, and finally winds around a drum, L″, which is on the main shaft C. This drum L″ has the same radius as the pitch-line of the pinion *c*, which operates the knee. When the knee is drawn back the chain is wound onto the drum, and as it advances it unwinds.

In the socket L is arranged a spring, (see dotted line,) or some elastic substance, by which the chain is kept rigidly taut at all times; or in place of this device an elastic cord can be used. The purpose of this device is to take up any slack or play which may occur in the rack and pinion, so that when the knee is set forward there will be no back slack.

In head-blocks heretofore made by me I have used chains in a similar position, but for the purpose of reacting the knee. (See patent to me September 1, 1868.) In that case the chains did not wind onto the setting-shaft, but onto a reacting-shaft. In that case the knees were pushed forward by a ratchet movement, and the chains incidentally served to hold the knee back against the ratchet-work, and thus prevent any play movement. In the present instance I use the chains to perform expressly what in that case they did incidentally. As the knees in this case are pushed forward by a rack-and-pinion movement, there is greater liability, through inaccuracy of construction and wear of parts, of play, which must be provided against, and I do it by the use of the chains named and the elastic connection, or some equivalent, as, for example, an elastic rope.

For the reasons just stated, I shall not now claim, broadly, the use of chains, &c., at that point for taking up the play in the working mechanism of the knee; but I shall claim them when in the combination I here show.

The third part of my invention, as stated above, consists in combining, with the parts above described, a reacting-spring, placed upon the main setting-shaft, whereby the same shaft shall serve to both advance and recede the knees.

In my prior patent, September 1, 1868, reissued November 7, 1871, the application of springs to recede the knees is fully explained; and in the patent to W. Gowen, June 14, 1871, springs are shown as used upon the main setting-shaft; so in this case I shall neither claim the use of springs, broadly, nor the use of them on the setting-shaft alone; but I believe I now present a new and useful combination whereby the advantage of reacting-springs is greatly augmented.

I believe I have above fully described all the parts comprising this combination, and also fully set forth how these parts are arranged to operate.

What I claim as new is—

1. The combination, upon the setting-shaft of a saw-mill head-block, of a ratchet-wheel, J, a reacting-spring, C′, and a pinion, *c*, said pinion being so placed as to operate upon the rack *b*, by which the knee B is operated, all substantially as and for the purposes mentioned.

2. The combination, within a saw-mill head-block, of the alternate acting pawls H and I, with their accompanying carriers, the ratchet-wheel J, shaft C, reacting-spring C′, pinion *c*, and rack *b*, all arranged to operate substantially as and for the purposes set forth.

3. In combination with the knees B, shaft C, ratchet J, and pawls H and I, or either of them, a tripping device, so applied as to release said pawls from said ratchet and allow the said springs to reverse the action of said shaft and recede the knees, substantially as herein set forth.

4. The combination of the trip M′, pawls H and I, and springs *h* and *i*, substantially as and for the purposes mentioned.

5. In combination with the pawls H and I and connecting-rods H″ and I″, the crank F, with pivot-pins placed as described, for the purposes mentioned.

6. The combination of the shaft C, pinion *c*, rack *b*, and slide B′ with the knee B, said knee being moved only when in communication with said slide by a proper attaching and detaching device, substantially as and for the purposes mentioned.

7. In combination with the chains L′, the knee B and shaft C, said chains being attached at one end to said knee and at the other end to said shaft C, for the purposes mentioned.

EDWARD H. STEARNS.

Witnesses:

JNO. K. HALLOCK,

GEO. P. GRIFFITH.